US007227652B2

(12) United States Patent
Cronch et al.

(10) Patent No.: US 7,227,652 B2
(45) Date of Patent: Jun. 5, 2007

(54) SWITCHING POWER SUPPLY, METHOD OF OPERATION AND DEVICE-AND-POWER-SUPPLY ASSEMBLY

(75) Inventors: Darell D. Cronch, Georgetown, KY (US); Hugh E. Gilbert, Versailles, KY (US); Daniel A. Leverett, Richmond, KY (US)

(73) Assignee: Lexmark International, Inc., Lexington, KY (US)

( * ) Notice: Subject to any disclaimer, the term of this patent is extended or adjusted under 35 U.S.C. 154(b) by 1020 days.

(21) Appl. No.: 10/272,923

(22) Filed: Oct. 17, 2002

(65) Prior Publication Data

US 2004/0075703 A1 Apr. 22, 2004

(51) Int. Cl.
*G06F 15/00* (2006.01)
*G06K 1/00* (2006.01)

(52) U.S. Cl. ......................... 358/1.14; 347/5; 323/282; 363/21.15; 307/40

(58) Field of Classification Search .................... 347/5, 347/50; 358/1.13, 1.14, 421, 1.15; 323/265, 323/282, 262; 363/21.15, 21.12, 21.07; 307/40, 307/50
See application file for complete search history.

(56) References Cited

U.S. PATENT DOCUMENTS 4,092,711 A 5/1978 Gerding et al.
4,335,445 A 6/1982 Nercessian
4,732,502 A 3/1988 Yokoi
4,736,089 A 4/1988 Hair et al.
4,761,725 A 8/1988 Henze
4,837,452 A 6/1989 Peterson
4,943,762 A 7/1990 Campbell et al.

(Continued)

FOREIGN PATENT DOCUMENTS

JP 1206845 8/1989

(Continued)

OTHER PUBLICATIONS

King et al., "Power Supplies for Electronic Equipment," IBM Technical Disclosure Bulletin, IBM Corp., vol. 27 (No. 8), p. 4730-4731, (Jan. 1985).

(Continued)

*Primary Examiner*—Aung Moe
*Assistant Examiner*—Dillon Murphy
(74) *Attorney, Agent, or Firm*—Thompson Hine LLP

(57) ABSTRACT

A switching power supply, with or without a secondary side controller, is connectable to a power-supply-using device (such as a printer without a power supply) receiving a voltage from the power-supply's secondary side. The device has a device controller (such as a printer controller) which controls the device, wherein the power supply is adapted to receive a power-supply control signal or power-supply control data from the device controller. A method for operating the switching power supply includes using the power-supply control signal or the power-supply control data to generate an input control signal for the power supply's primary side controller. A device-and-power-supply assembly (such as a printer) includes a switching power supply lacking a secondary side controller and includes a power-supply-using device having a device controller (such as a printer controller) wherein the power supply is adapted to receive a power-supply control signal from the device controller.

10 Claims, 4 Drawing Sheets

U.S. PATENT DOCUMENTS

| | | | | |
|---|---|---|---|---|
| 5,162,721 | A | 11/1992 | Sato | |
| 5,196,832 | A | 3/1993 | Griffin | |
| 5,216,349 | A | 6/1993 | Kanouda et al. | |
| 5,218,607 | A | 6/1993 | Saito et al. | |
| 5,369,352 | A | 11/1994 | Toepfer et al. | |
| 5,465,039 | A * | 11/1995 | Narita et al. | 320/164 |
| 5,475,296 | A | 12/1995 | Vinsant et al. | |
| D366,477 | S | 1/1996 | Gassett et al. | |
| 5,523,676 | A | 6/1996 | Bach et al. | |
| 5,568,370 | A | 10/1996 | Goldstein et al. | |
| 5,578,916 | A | 11/1996 | Muterspaugh | |
| 5,636,112 | A | 6/1997 | Faulk | |
| D382,297 | S | 8/1997 | McGlashan et al. | |
| 5,654,623 | A | 8/1997 | Shiga et al. | |
| 5,675,240 | A | 10/1997 | Fujisawa et al. | |
| 5,689,179 | A | 11/1997 | Walker | |
| 5,717,937 | A | 2/1998 | Fritz | |
| 5,758,175 | A | 5/1998 | Fung | |
| 5,767,744 | A * | 6/1998 | Irwin et al. | 330/297 |
| 5,818,705 | A | 10/1998 | Faulk | |
| 5,821,641 | A | 10/1998 | Demo et al. | |
| 5,903,138 | A | 5/1999 | Hwang et al. | |
| 5,911,080 | A | 6/1999 | Yeom | |
| 5,914,538 | A * | 6/1999 | Kurosawa et al. | 307/18 |
| 5,935,252 | A | 8/1999 | Berglund et al. | |
| 5,943,227 | A | 8/1999 | Bryson et al. | |
| 6,023,156 | A | 2/2000 | Buhler | |
| 6,054,846 | A * | 4/2000 | Castleman | 323/283 |
| 6,068,360 | A | 5/2000 | Hiwada | |
| 6,072,706 | A | 6/2000 | Chen | |
| 6,075,949 | A | 6/2000 | Hatakenaka et al. | |
| 6,094,367 | A | 7/2000 | Hsu et al. | |
| 6,100,676 | A | 8/2000 | Burstein et al. | |
| 6,105,140 | A | 8/2000 | Crisan | |
| 6,119,237 | A | 9/2000 | Cho | |
| 6,125,048 | A | 9/2000 | Loughran et al. | |
| 6,137,702 | A | 10/2000 | Hall et al. | |
| 6,138,242 | A | 10/2000 | Massman et al. | |
| 6,144,278 | A | 11/2000 | Nishida et al. | |
| 6,147,885 | A | 11/2000 | Brand et al. | |
| 6,157,182 | A | 12/2000 | Tanaka et al. | |
| 6,199,969 | B1 | 3/2001 | Haflinger et al. | |
| 6,226,190 | B1 | 5/2001 | Balakrishnan et al. | |
| 6,236,194 | B1 | 5/2001 | Manabe et al. | |
| 6,260,151 | B1 | 7/2001 | Omizo et al. | |
| 6,268,716 | B1 | 7/2001 | Burstein et al. | |
| 6,297,623 | B1 | 10/2001 | Balakrishnan et al. | |
| 6,301,135 | B1 | 10/2001 | Mammano et al. | |
| 6,327,663 | B2 | 12/2001 | Isaac et al. | |
| 6,366,481 | B1 | 4/2002 | Balakrishnan et al. | |
| 6,377,646 | B1 * | 4/2002 | Sha | 375/376 |
| 6,434,024 | B2 | 8/2002 | Shirato | |
| 6,434,030 | B1 | 8/2002 | Rehm et al. | |
| 6,441,590 | B1 | 8/2002 | Amantea et al. | |
| 6,456,511 | B1 | 9/2002 | Wong | |
| 6,483,204 | B2 * | 11/2002 | Hanaki | 307/23 |
| 6,519,165 | B2 * | 2/2003 | Koike | 363/21.12 |
| 6,674,271 | B2 * | 1/2004 | Choo et al. | 323/282 |
| 2002/0097589 | A1 | 7/2002 | Jansen et al. | |

FOREIGN PATENT DOCUMENTS

| | | |
|---|---|---|
| JP | 9305341 | 11/1997 |
| JP | 11198482 | 7/1999 |

OTHER PUBLICATIONS

"Automatic Input-Selecting Power Supply," IBM Technical Disclosure Bulletin, IBM Corp., vol. 28 (No. 3), p. 1246-1247, (Aug. 1985).

* cited by examiner

SWITCHING POWER SUPPLY, METHOD OF OPERATION AND DEVICE-AND-POWER-SUPPLY ASSEMBLY

TECHNICAL FIELD

The present invention relates generally to power supplies, and more particularly to a switching power supply, to a method for operating a switching power supply, and to a device-and-power-supply assembly.

BACKGROUND OF THE INVENTION

Switching power supplies are well known. A switching power supply has a primary side and a secondary side, wherein the secondary side is inductively coupled to the primary side to produce at least one voltage. The primary side operates from line voltage. A primary side controller controls the primary side to provide a controlled output voltage. Known designs include those wherein a secondary side controller provides feedback control (of appropriate gain and phase for the particular switching power supply) of one of the secondary side voltages of the secondary side to the primary side controller to maintain stability of that voltage under varying load conditions.

Switching power supplies are used to run power-supply-using devices. Power-supply-using devices include, without limitation, printers (without a power supply), such as ink jet printers having a printer controller, having a print head, and having a print head carriage motor and one or more paper feed motors. The printer controller controls the operation of the motors and the print head to eject ink onto the paper. The device and the power supply together may be called a device-and-power-supply assembly.

Certain devices, such as computer monitors and copiers are known to operate in reduced power modes when the device is idle. Certain devices, such as ink jet printers, are known to operate with external (i.e., external to the printer housing) power supplies and with internal (i.e., internal to the printer housing) power supplies.

What is needed is one or more of an improved switching power supply, an improved method for operating a switching power supply, and an improved device-and-power-supply assembly.

SUMMARY OF THE INVENTION

A method of the invention is for operating a switching power supply, wherein the switching power supply includes a primary side having a primary side controller and includes a secondary side inductively coupled to the primary side, wherein a power-supply-using device receives at least one voltage from the secondary side and has a device controller which controls the device. The method includes the step of obtaining a power-supply control signal or power-supply control data from the device controller. The method also includes the step of using at least the power-supply control signal or the power-supply control data to generate an input control signal for the primary side controller.

A first expression of a first embodiment of the invention is for a device-and-power-supply assembly including a switching power supply, a power-supply-using device, and a signal path. The switching power supply has a primary side including a primary side controller and has a secondary side lacking a secondary side controller and inductively coupled to the primary side for producing at least one voltage. The device receives the at-least-one voltage from the secondary side and has a device controller which controls the device. The signal path electrically couples the device controller to the primary side controller, wherein the primary side controller is adapted to receive an input control signal generated at least in part from a power-supply control signal obtained along the signal path from the device controller.

A second expression of a first embodiment of the invention is for a switching power supply including a primary side and a secondary side. The primary side includes a primary side controller. The secondary side lacks a secondary side controller and is inductively coupled to the primary side for producing at least one voltage. The secondary side is connectable to a power-supply-using device receiving the at-least-one voltage and has a device controller which controls the device. The primary side controller is adapted to receive an input control signal generated at least in part from a power-supply control signal obtained from the device controller along a signal path electrically coupling the device controller to the primary side controller when the secondary side is connected to the device.

A first expression of a second embodiment of the invention is for a switching power supply including a primary side and a secondary side. The primary side includes a primary side controller. The secondary side includes a secondary side controller. The secondary side is inductively coupled to the primary side for producing at least one voltage. The secondary side is connectable to a power-supply-using device receiving the at-least-one voltage and having a device controller which controls the device. The secondary side controller is adapted to receive power-supply control data along a data path from the device controller when the secondary side is connected to the device, and the primary side controller is adapted to receive an input control signal from the secondary side controller generated at least in part from the power supply control data. In one example, the data path is a bidirectional data path.

Several benefits and advantages are derived from one or more of the method and the expressions of the embodiments of the invention. The device controller (such as a printer controller) of the device (such as an ink jet printer without a power supply) not only controls the device but also controls the switching power supply from the secondary side of the switching power supply without adding additional primary to secondary couplers. In one example of an ink-jet-printer type device, the power-supply control signal or the power-supply control data is based at least in part on the print head voltage measured at the print head to accurately control the print head voltage under varying load conditions.

In another such example, the power-supply control signal or the power-supply control data is based at least in part on substantially matching the power supplied by the switching power supply with the different power needs of the ink jet printer to operate in different ones of a plurality of operating modes such as at least two of a power-up mode, a shut-down mode, a low power standby mode, an operating mode of a first print head requiring a first voltage, an operating mode of a second print head requiring a second voltage, and a paper feed operating mode. In a further such example, a modulating waveform is superimposed on the input control signal to reduce EMI (electromagnetic interference). In an additional example, a power supply identification signal is sent from the switching power supply to the printer controller, and the power-supply control signal is based at least in part on the identification signal to choose a gain and phase suitable for the identified switching power supply thus allowing different switching power supplies having different operating characteristics from different vendors to be used in manufacturing quantities of the same printer model.

DETAILED DESCRIPTION

Figure 1:
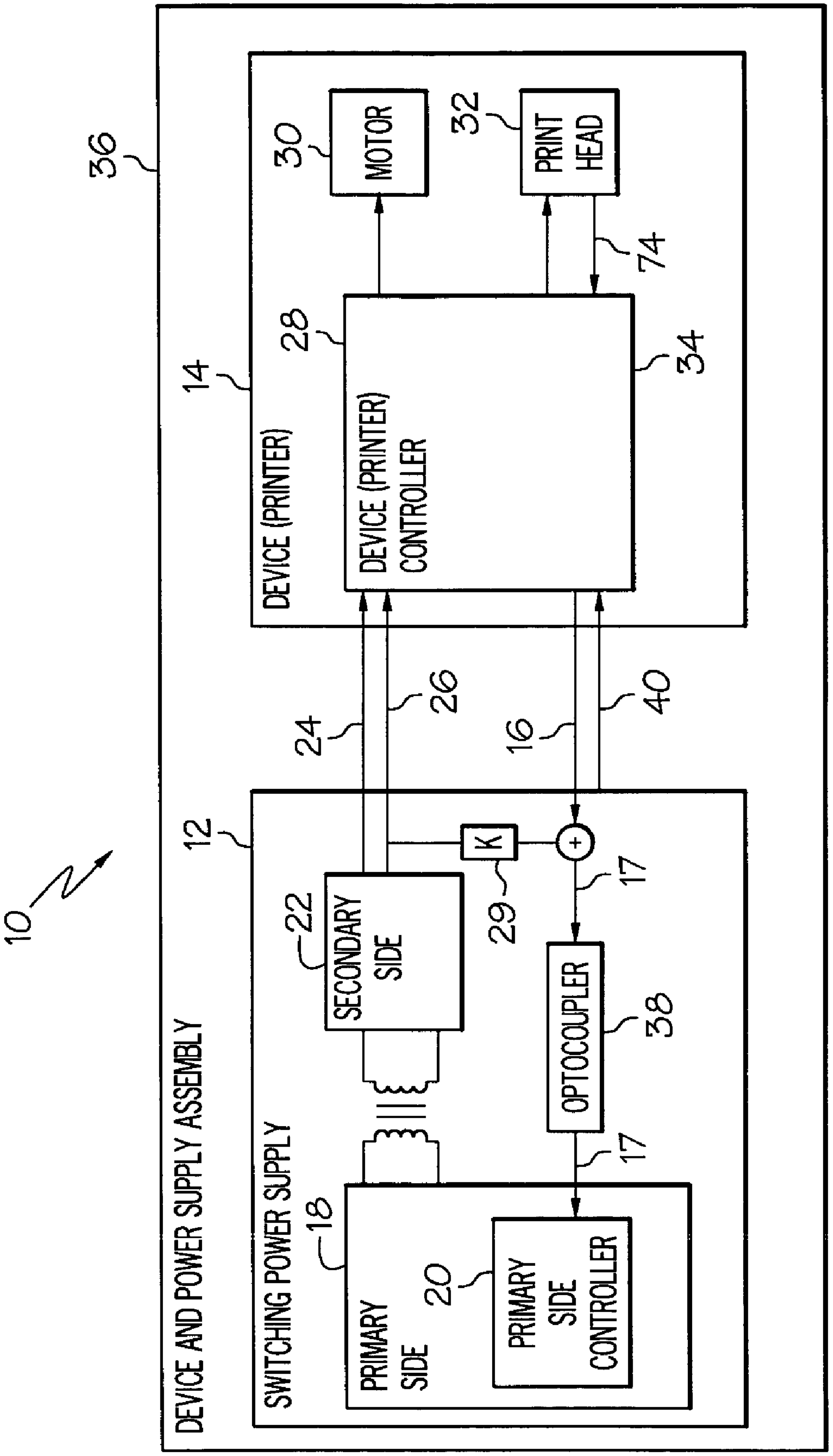
FIG. 1 is a block diagram of a first embodiment of the invention having a device in the form of an ink jet printer (without a power supply) and having a switching power supply which lacks a secondary side controller.

A first embodiment of the invention is shown in FIG. 1. A first expression of the first embodiment of FIG. 1 is for a device-and-power-supply assembly 10 including a switching power supply 12, a power-supply-using device 14, and a signal path 16 and 17. The switching power supply 12 has a primary side 18 including a primary side controller 20 and has a secondary side 22 lacking a secondary side controller and inductively coupled to the primary side 18 for producing at least one voltage 24 and 26. The device 14 receives the at-least-one voltage 24 and 26 from the secondary side 22 and has a device controller 28 which controls the device 14. The signal path 16 and 17 electrically couples the device controller 28 to the primary side controller 20, wherein the primary side controller 20 is adapted to receive an input control signal generated at least in part from a power-supply control signal obtained along the signal path 16 and 17 path from the device controller 28. It is noted that a "power-supply-using device" is defined to be a device which uses a power supply to perform at least one non-power-supply function.

In one arrangement, as shown in FIG. 1, at least one of the at-least-one voltage 24 and 26 is also coupled to the primary side controller 20 through a gain/attenuation block 29 (labeled K in the figure) to supply an additional component for the input control signal to the primary side controller 20 as shown in the figure. In another arrangement, not shown, block 29 is removed and a feedback signal is provided through a feedback winding on the transformer, as can be appreciated by those skilled in the art. Such added arrangements are optional and other optional added arrangements are left to the artisan.

One example of the device-and-power-supply assembly 10 is an ink jet printer, wherein the device 14 is the ink jet printer without the power supply, and wherein the device controller 28 is a printer controller which controls the ink jet printer such as controlling at least one motor 30 (such as a paper feed motor and a print head carriage motor) and controlling the firing of a print head 32. In one enablement, the printer controller resides in an application specific integrated circuit (ASIC) 34. In one variation, the assembly 10 includes an ink jet printer housing 36, and the ASIC 34 and the switching power supply 12 reside in the printer housing 36, wherein the ASIC 34 is electrically connected to the switching power supply 12 by a cableless connection (such as by a pin connection). Other examples of the assembly 10 include a copier and a VCR (video cassette recorder). Still other examples of the assembly 10 are left to the artisan for existing assemblies and to the inventor for as yet unknown assemblies. In one configuration, the signal path 16 and 17 includes an optocoupler 38 (or other component, such as a transformer, etc., for physical isolation of the device controller 28 from the primary side controller 20). It is noted that the line voltage to the primary side 18 of the switching power supply 12 has been omitted for clarity in FIG. 1.

A second expression of the first embodiment of FIG. 1 is for a switching power supply 12 including a primary side 18 and a secondary side 22. The primary side 18 includes a primary side controller 20. The secondary side 22 lacks a secondary side controller and is inductively coupled to the primary side 18 for producing at least one voltage 24 and 26. The secondary side 22 is connectable to a power-supply-using device 14 receiving the at-least-one voltage 24 and 26 and having a device controller 28 which controls the device 14. The primary side controller 20 is adapted to receive an input control signal generated at least in part from a power-supply control signal obtained from the device controller 28 along a signal path 16 and 17 electrically coupling the device controller 28 to the primary side controller 20 when the secondary side 22 is connected to the device 14.

In one example, the switching power supply 12, is adapted to send a power-supply identification signal 40 to the device controller 28 when the secondary side 22 is connected to the device 14. In this example, the power-supply control signal is based at least in part on the power-supply identification signal 40. In one implementation, the device controller 28 chooses the gain and/or phase for the power-supply control signal to match the operating characteristics of the particular switching power supply 12 being used.

In one construction, a molded feature on the case of the switching power supply 12 operates one or more switches when inserted into the device 14. In a different construction, a set of electrical contacts on the power supply printed circuit board (PCB) provides shunts when inserted providing decoding signals to identify the switching power supply 12. In a different construction, one or more signal levels on one or more contacts provides the decoding signals. In another construction, an embedded memory component in the switching power supply 12 with a serial or parallel interface provides a decoding bit pattern.

In another construction, one or more contact signal levels forms a bit pattern wherein a detectable voltage level provides the decoding method. In an additional construction, an optical photo coupler in the device 14 detects the presence or absence of a particular power supply PCB or case. In an additional construction, a magnetic or magnet component is inserted in the switching power supply 12, and the device 14 has a decoding circuit to identify the particular switching power supply 12. Other constructions are left to the artisan.

In the same or a different example, the device 14 is an ink jet printer without a power supply, wherein the device controller 28 is a printer controller which controls the ink jet printer such as controlling at least one motor 30 (such as a paper feed motor and a print head carriage motor) and controlling the firing of a print head 32, and wherein the signal path 16 and 17 includes an optocoupler 38.

Figure 2:
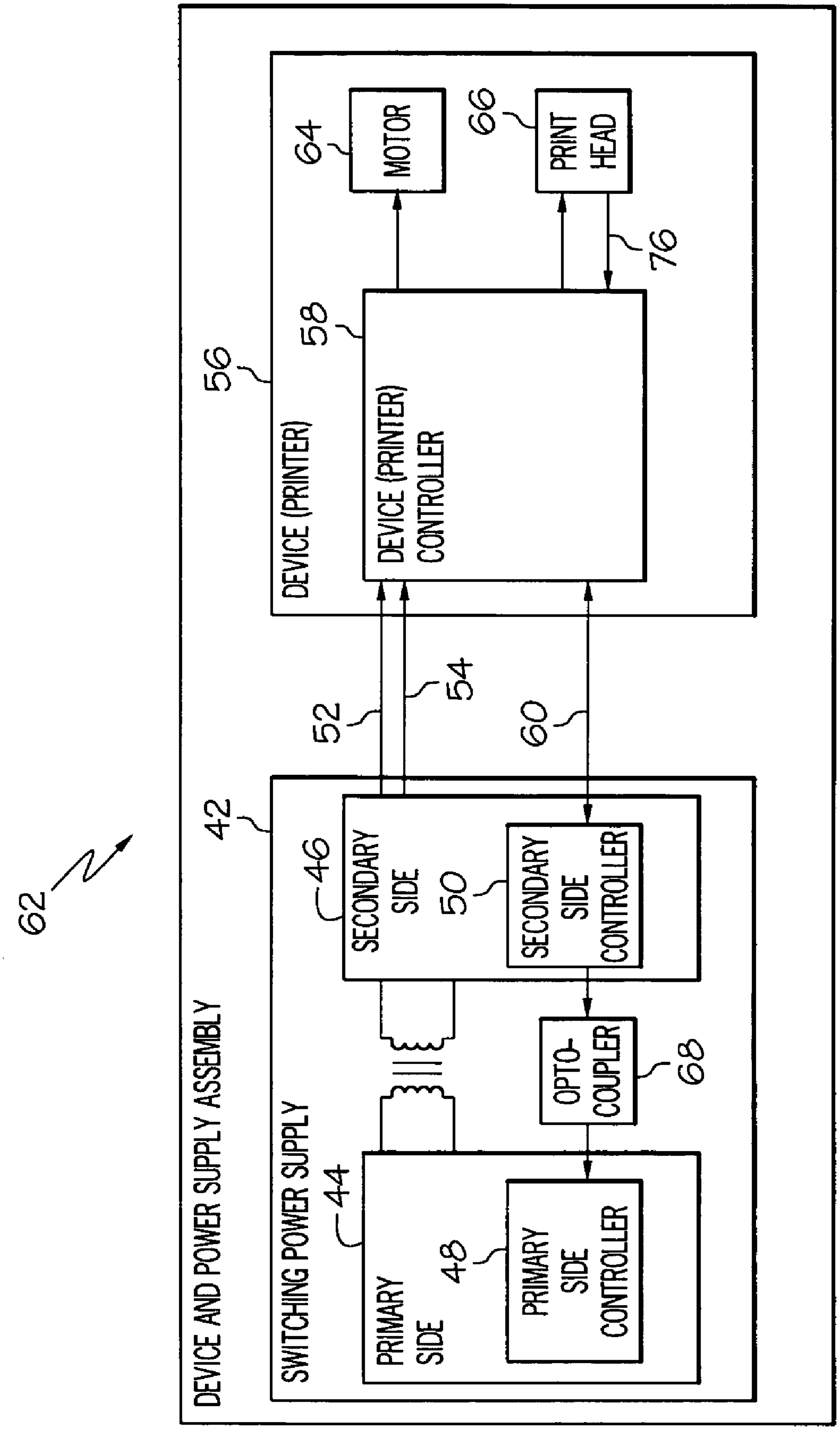
FIG. 2 is a block diagram of a second embodiment of the invention having a switching power supply including a secondary side controller.

A second embodiment of the invention is shown in FIG. 2. A first expression of the second embodiment of FIG. 2 is for a switching power supply 42 including a primary side 44 and a secondary side 46. The primary side 44 includes a primary side controller 48. The secondary side 46 includes a secondary side controller 50, wherein the secondary side 46 is inductively coupled to the primary side 44 for producing at least one voltage 52 and 54. The secondary side 46 is connectable to a power-supply-using device 56 receiving the at-least-one voltage 52 and 54 and having a device controller 58 which controls the device 56. The secondary side controller 50 is adapted to receive power-supply control data along a data path 60 from the device controller 58 when the secondary side 46 is connected to the device 56, and the primary side controller 48 is adapted to receive an input control signal from the secondary side controller 50 generated at least in part from the power supply control data.

In one arrangement, the secondary side controller 50 also makes use of at least one of the at-least-one voltage 52 and 54 through a gain/attenuation block (not shown) to supply an additional component for the input control signal to the primary side controller 48. In another arrangement, such gain/attenuation block is removed and a feedback signal is provided through a feedback winding (not shown) on the transformer, as can be appreciated by those skilled in the art. Such added arrangements are optional and other optional added arrangements are left to the artisan.

When the secondary side 46 is connected to the device 56, the combination defines a device-and-power-supply assembly 62. In one example, the data path 60 is a bidirectional data path. In the same or a different example, the device 56 is an ink jet printer without a power supply, and the device controller 58 is a printer controller which controls the ink jet printer such as controlling at least one motor 64 (such as a paper feed motor and a print head carriage motor) and controlling the firing of a print head 66. In one design, the secondary side controller 50 is electrically coupled to the primary side controller 48 through an optocoupler 68.

In one enablement of the first and/or second embodiments of FIGS. 1 and/or 2, the input control signal includes a superimposed modulating waveform to reduce EMI (electromagnetic interference).

Figure 4:
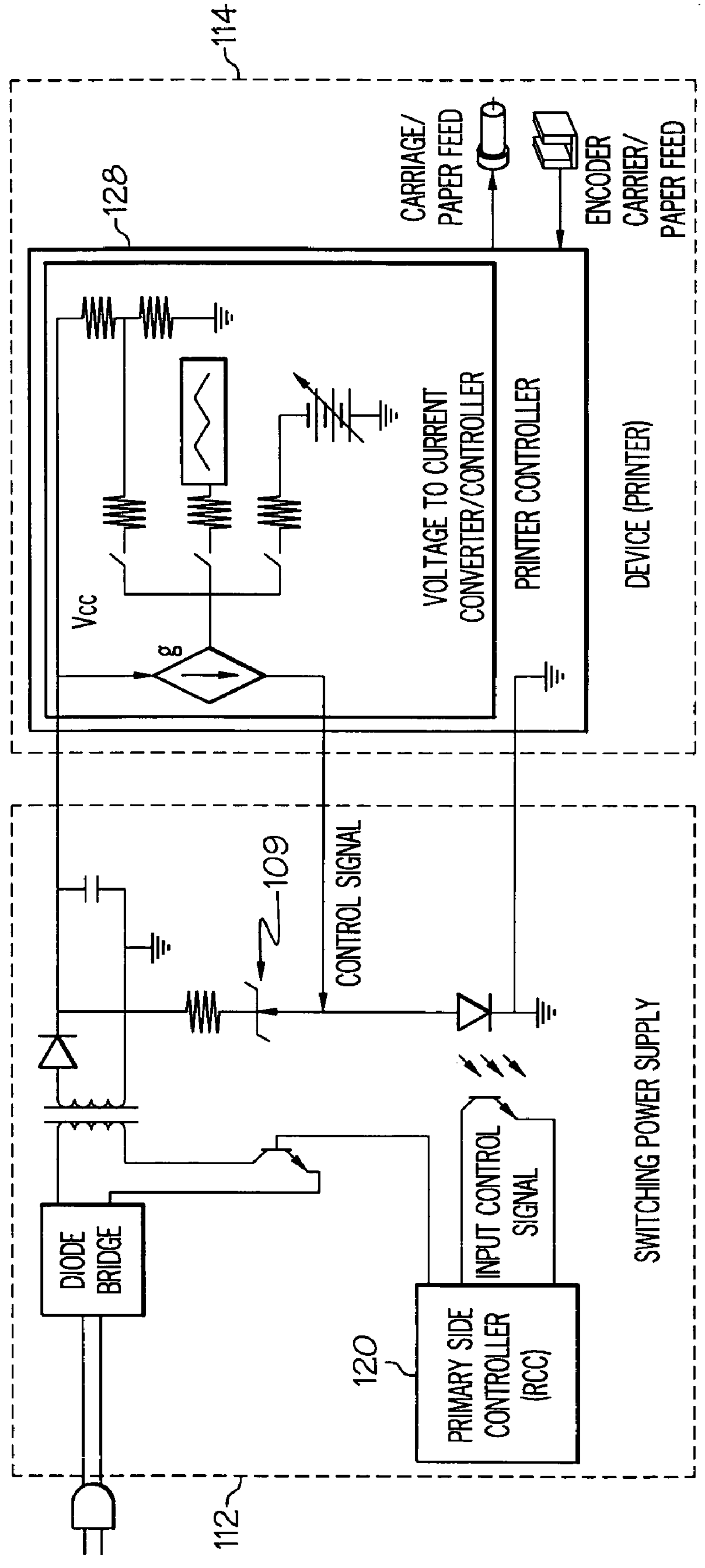
FIG. 4 is a block diagram of exemplary form of the embodiment depicted in FIG. 1.

FIG. 4 depicts one of the various switching power supply topologies that can be used in various embodiments of the present invention. The depicted topology comprises a primary side with a primary side controller 120 in the form of a Self Oscillating Flyback Controller (commonly referred to as a Ringing Choke Converter (RCC)). This RCC design is a variable switching frequency design that operates in critical conduction mode, thereby maintaining an approximately fixed duty cycle.

In an RCC design, power output is inversely proportional to switching frequency. In this embodiment, if there is no control signal from printer controller 128 (e.g., switching power supply 112 is not attached to printer 114), $V_{cc}$ generated by switching power supply 112 rises until it activates zener diode 109 in a secondary side of the switching power supply. Feedback is provided through zener diode 109 to limit $V_{cc}$ to a level higher than that desired by printer controller 128, but below any safety or functional threshold that may exist. When switching power supply 112 is connected to printer 114, the printer then provides an input control signal, which acts to override the feedback from zener diode 109 and lower $V_{cc}$ to the desired level.

Thus, in addition to controlling printer 114, printer controller 128 provides secondary side control of primary side controller 120. Furthermore, printer controller 128 has the ability to modify and control the output $V_{cc}$ voltage in concert with the printer's functional and current requirements. Additionally, it can perform a remote voltage sense function by sensing any of a number of voltages within printer 114 and modifying the control signal accordingly.

As previously discussed, the RCC design is a variable switching frequency design. This characteristic is useful to accomplish significant EMI reduction. When the input control signal is modulated slightly, this skews the switching frequency enough to accomplish a spread spectrum effect. This modulation signal can be in the form of a triangle wave or other spreading waveform, for example.

Figure 3:
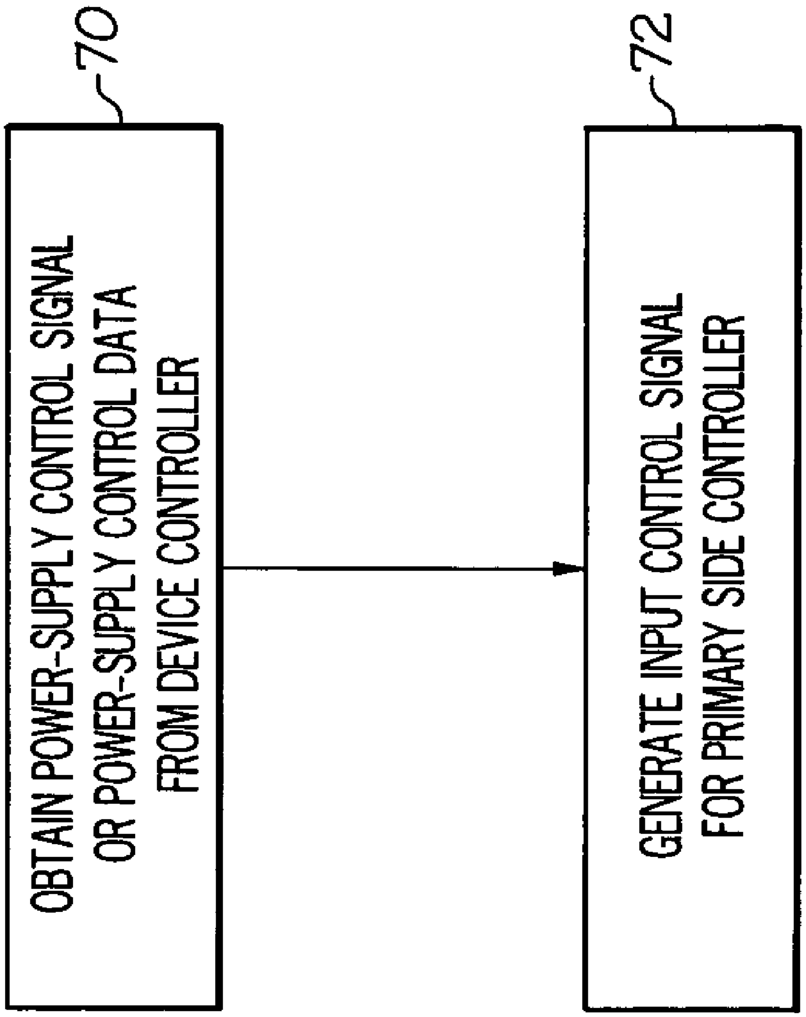
FIG. 3 is a flow chart of a method of the invention for operating a switching power supply.

A method of the invention is for operating a switching power supply 12 and 42, wherein the switching power supply 12 and 42 includes a primary side 18 and 44 having a primary side controller 20 and 48 and includes a secondary side 22 and 46 inductively coupled to the primary side 20 and 48, and wherein a power-supply-using device 14 and 56 receives at least one voltage 24 & 26 and 52 & 54 from the secondary side 22 and 46 and has a device controller 28 and 58 which controls the device 14 and 56. The method is shown in flow-chart form in FIG. 3 and includes steps a) and b). Step a) is labeled as "Obtain Power-Supply Control Signal Or Power-Supply Control Data From Device Controller" in block 70 of FIG. 3. Step a) includes obtaining a power-supply control signal or power-supply control data from the device controller 28 and 58. Step b) is labeled as "Generate Input Control Signal For Primary Side Controller" in block 72 of FIG. 3. Step b) includes using at least the power-supply control signal or the power-supply control data to generate an input control signal for the primary side controller 20 and 48.

In one example, the input control signal of step b) is the only input control signal for the primary side controller. Other examples are left to the artisan.

Referring to FIG. 1, in one application of the method, the secondary side 22 lacks a secondary side controller, step a) obtains a power-supply control signal from the device controller 28, and step b) uses the power-supply control signal as at least a part of the input control signal for the primary side controller 20. Referring to FIG. 2, in another application of the method, the secondary side 46 has a secondary side controller 50, wherein step a) obtains power-supply control data from the device controller 58, wherein the output of the secondary side controller 50 is the input control signal for the primary side controller 48, and wherein step b) uses the power-supply control data as an input to the secondary side controller 50. In one variation, the at-least-one voltage is at least two voltages, and the at-least-two voltages are enabled in a sequence defined by the secondary side controller 50. In one construction, step b) employs an optocoupler 38 and 68 between the device controller 28 and 58 of the device 14 and 56 and the primary side controller 20 and 48 of the switching power supply 12 and 42.

In one choice, the device 14 and 56 is an ink jet printer without a power supply, and the device controller 28 and 58 is a printer controller which controls the ink jet printer such as controlling at least one motor 30 and 64 (such as a paper feed motor and a print head carriage motor) and controlling the firing of a print head 32 and 66. In a first variation, the at-least-one voltage 24 & 26 and 52 & 54 includes a print head voltage, and the power-supply control signal or the power-supply control data obtained in step a) is based at least in part on (and in one case equals) the print head voltage measured at the print head 32 and 66 (and transmitted such as by a print head voltage signal 74 and 76 as shown in FIGS. 1 and 2 or by a signal, not shown, going directly from the print head to the secondary side controller if the secondary side controller is present). In this variation, the power-supply control signal or the power-supply control data is used to accurately control the print head voltage of the at-least-one voltage received by the ink jet printer (without a power supply) from the secondary side 22 and 46 of the switching power supply 12 and 42.

In another variation, the power-supply control signal or the power-supply control data obtained in step a) is based at least in part on substantially matching the power supplied by the switching power supply 12 and 42 with the different power needs of the ink jet printer (or other device 14 and 56) to operate in different ones of a plurality of operating modes. In this variation, the printer controller forces the switching power supply to supply a printer-controller-determined value for one (or more) of the at-least-one voltage at the secondary side of the switching power supply, wherein the printer controller determines the value at least in part on the present operating mode of the printer (and in one case determines that the value equal a minimum voltage required by the present operating mode of the printer to conserve power). In one implementation, the operating modes are chosen from at least two of the group consisting of: a power-up mode, a shut-down mode, a low power standby mode, an operating mode of a first print head requiring a first voltage, an operating mode of a second print head requiring a different second voltage, and a paper feed operating mode. In the same or a different implementation, the power-supply control signal controls the current limits of the switching power supply 12 and 42 as part of matching the power supplied by the switching power supply to the power needed by a particular operating mode of the ink jet printer (or other device 14 and 56).

In one modification of any variation, the method also includes the step of superimposing a modulating waveform on the input control signal to reduce EMI (electromagnetic interference). In the same or a different modification, the method also includes the step of adjusting the input control signal to maintain stability of the at-least-one voltage when the operating mode is the low power standby mode, as can be appreciated by those skilled in the art.

In one extension of the method, and referring to FIG. 1, there is also included the step of sending a power-supply identification signal 40 from the switching power supply 12 to the printer controller (or other device controller 28). In this extension of the method, step a) obtains a power-supply control signal from the device controller 28, and the power-supply control signal obtained in step a) is based at least in part on the identification signal. Several techniques for generating the power-supply identification signal 40 have been previously discussed.

In one utilization of the method, at least one power-supply status signal is sent from the switching power supply 42 to the printer controller (or other device controller) 58 along the previously-discussed bidirectional data path. In the same or a different utilization, the power-supply control data establishes the power-up sequencing for multiple outputs as can be appreciated by those skilled in the art. In the same or a different utilization, the gain and/or phase of the input control signal is based at least in part on the operating mode regardless of whether or not the switching power supply 12 and 42 is operating at reduced power.

In one implementation of the method, the at-least-one voltage includes a print-motor driver voltage and a print-head voltage, wherein the printer controller uses the print head voltage to generate a lower printer-controller-logic voltage. In the same or a different implementation, the power supply control signal is a "current" error signal generated by a variable current source.

In one method and/or embodiment, the power-supply control signal performs multiple power-supply-controlling functions, or multiple power-supply control signals are employed for performing multiple power-supply-controlling functions, such as (but not limited to) the previously described power-conserving function and the previously described current-limit-setting function. In one design, there are multiple signal paths or data paths and/or different power-supply control signals or different power-supply control data are multiplexed on a single signal or data path and/or multiple power-supply control signals are superimposed on the signal path 16 & 17, as can be appreciated by those skilled in the art.

Several benefits and advantages are derived from one or more of the method and the expressions of the embodiments of the invention. The device controller (such as a printer controller) of the device (such as an ink jet printer without a power supply) not only controls the device but also controls the switching power supply from the secondary side of the switching power supply without adding additional primary to secondary couplers. In one example of an ink-jet-printer type device, the power-supply control signal or the power-supply control data is based at least in part on the print head voltage measured at the print head to accurately control the print head voltage under varying load conditions.

In another such example, the power-supply control signal or the power-supply control data is based at least in part on substantially matching the power supplied by the switching power supply with the different power needs of the ink jet printer to operate in different ones of a plurality of operating modes such as at least two of a power-up mode, a shut-down mode, a low power standby mode, an operating mode of a first print head requiring a first voltage, an operating mode of a second print head requiring a second voltage, and a paper feed operating mode. In a further such example, a modulating waveform is superimposed on the input control signal to reduce EMI (electromagnetic interference). In an additional example, a power supply identification signal is sent from the switching power supply to the printer controller, and the power-supply control signal is based at least in part on the identification signal to choose a gain and phase suitable for the identified switching power supply thus allowing different switching power supplies having different operating characteristics from different vendors to be used in manufacturing quantities of the same printer model.

The foregoing description of a method and several expressions of two embodiments of the invention has been presented for purposes of illustration. It is not intended to be exhaustive or to limit the invention to the precise procedures and forms disclosed, and obviously many modifications and variations are possible in light of the above teaching. It is intended that the scope of the invention be defined by the claims appended hereto.

What is claimed is:

1. A method for operating a switching power supply, wherein the switching power supply includes a primary side having a primary side controller and includes a secondary side inductively coupled to the primary side, wherein a power-supply-using device receives at least one voltage from the secondary side and has a device controller which controls the device, and wherein the method comprises the steps of:

a) obtaining a power-supply control signal or power-supply control data from the device controller; and b) using at least the power-supply control signal or the power-supply control data to generate an input control signal for the primary side controller, wherein the device is an ink jet printer without a power supply, and wherein the device controller is a printer controller which controls the ink jet printer.

2. The method of claim 1, wherein the at-least-one voltage includes a print head voltage, and wherein the power-supply control signal or the power-supply control data obtained in step a) is based at least in part on the print head voltage measured at the print head.

3. The method of claim 1, wherein the power-supply control signal or the power-supply control data obtained in step a) is based at least in part on substantially matching the power supplied by the switching power supply with the different power needs of the ink jet printer to operate in different ones of a plurality of operating modes.

4. The method of claim 3, wherein the operating modes are chosen from at least two of the group consisting of: a power-up mode, a shut-down mode, a low power standby mode, an operating mode of a first print head requiring a first voltage, an operating mode of a second print head requiring a different second voltage, and a paper feed operating mode.

5. The method claim 4, also including the stop of superimposing a modulating waveform on the input control signal to reduce EMI (electromagnetic interference).

6. The method of claim 4, also including the step of adjusting the input control signal to maintain stability of the at-least-one voltage when the operating mode is the low power standby mode.

7. The method of claim 1, also including the step of sending a power-supply identification signal from the switching power supply to the printer controller, wherein step a) obtains a power-supply control signal from the device controller, and wherein the power-supply control signal obtained in step a) is based at least in part on the identification signal.

8. A device-and-power-supply assembly comprising:

a) a switching power supply having a primary side including a primary side controller and having a secondary side lacking a secondary side controller and inductively coupled to the primary side for producing at least one voltage;

b) a power-supply-using device receiving the at-least-one voltage from the secondary side and having a device controller which controls the device;

c) a signal path electrically coupling the device controller to the primary side controller, wherein the primary side controller is adapted to receive an input control signal generated at least in part from a power-supply control signal obtained along the signal path from the device controller; and d) an ink jet printer housing, wherein the device is an ink jet printer without a power supply, wherein the device controller is a printer controller which controls the ink jet printer and which resides in an application specific integrated circuit (ASIC), wherein the ASIC and the switching power supply reside in the printer housing, and wherein the ASIC is electrically connected to the switching power supply by a cableless connection.

9. A switching power supply comprising a primary side and a secondary side, wherein the primary side includes a primary side controller, wherein the secondary side lacks a secondary side controller and is inductively coupled to the primary side for producing at least one voltage, wherein the secondary side is connectable to a power-supply-using device receiving the at-least-one voltage and having a device controller which controls the device, wherein the primary side controller is adapted to receive an input control signal generated at least in part from a power-supply control signal obtained from the device controller along a signal path electrically coupling the device controller to the primary side controller when the secondary side is connected to the device, wherein the switching power supply is adapted to send a power-supply identification signal to the device controller when the secondary side is connected to the device, wherein the power-supply control signal is based at least in part on the power-supply identification signal, and wherein the device is an ink jet printer without a power supply, wherein the device controller is a printer controller which controls the ink jet printer, and wherein the signal path includes an optocoupler.

10. A switching power supply comprising:

a) a primary side including a primary side controller: and b) a secondary side including a secondary side controller, wherein the secondary side is inductively coupled to the primary side for producing at least one voltage, wherein the secondary side is connectable to a power-supply-using device receiving the at-least-one voltage and having a device controller which controls the device, wherein the secondary side controller is adapted to receive power-supply control data along a data path from the device controller when the secondary side is connected to the device, and wherein the primary side controller is adapted to receive an input control signal from the secondary side controller generated at least in part from the power-supply control data, wherein the data path is a bidirectional data, and wherein the device is an ink jet printer without a power supply, and wherein the device controller is a printer controller which controls the ink jet printer.

* * * * *